(12) United States Patent
Moen et al.

(10) Patent No.: US 12,135,669 B1
(45) Date of Patent: Nov. 5, 2024

(54) HARDWARE FOR INTEGRATION OF SERVERS INTO A MANAGEMENT NETWORK

(71) Applicant: Amazon Technologies, Inc., Seattle, WA (US)

(72) Inventors: Michael Moen, Olympia, WA (US); Darin Lee Frink, Lake Tapps, WA (US); Ravi Akundi Murty, Kirkland, WA (US); Robert Charles Swanson, Olympia, WA (US); Anthony Nicholas Liguori, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 17/709,199

(22) Filed: Mar. 30, 2022

Related U.S. Application Data

(60) Provisional application No. 63/316,324, filed on Mar. 3, 2022.

(51) Int. Cl.
*G06F 13/40* (2006.01)
*H04L 41/40* (2022.01)

(52) U.S. Cl.
CPC .......... *G06F 13/4081* (2013.01); *H04L 41/40* (2022.05)

(58) Field of Classification Search
CPC .................................................. G06F 13/4081
See application file for complete search history.

(56) References Cited

U.S. PATENT DOCUMENTS

| 6,141,683 | A | 10/2000 | Kraml |
| 6,658,447 | B2 | 12/2003 | Cota-Robles |
| 6,741,585 | B1 | 5/2004 | Munoz et al. |

(Continued)

FOREIGN PATENT DOCUMENTS

| CN | 105027108 | 11/2015 |
| CN | 105308931 | 2/2016 |

(Continued)

OTHER PUBLICATIONS

U.S. Appl. No. 16/017,886, filed Jun. 25, 2018, Upendra Bhalchandra Shevade et al.

(Continued)

*Primary Examiner* — Brian T Misiura
(74) *Attorney, Agent, or Firm* — Alexander A. Knapp; Kowert, Hood, Munyon, Rankin & Goetzel, P.C.

(57) ABSTRACT

An interposer card and a virtualization offloading card are provided for installation in a third-party server to integrate the third-party server into a cloud service provider network. The interposer card includes a baseboard management controller that interfaces with a management console of the cloud service provider network. This allows the third-party server to be converted into a server controlled by the cloud service provider network. Additionally, the baseboard management controller of the interposer card acts as a firewall between the third-party server and a management control network of the cloud service provider network. The interposer card and the virtualization offloading card are installed in a chassis of the third-party server via an expansion slot without requiring modification of the hardware or firmware of the third-party server.

20 Claims, 9 Drawing Sheets

(56) References Cited

U.S. PATENT DOCUMENTS

| | | | |
|---|---|---|---|
| 7,484,084 B1 | 1/2009 | Ranaweera | |
| 7,484,091 B2 | 1/2009 | Bade et al. | |
| 7,493,436 B2 | 2/2009 | Blackmore et al. | |
| 7,620,731 B1 | 11/2009 | Dasan | |
| 7,698,707 B2 | 4/2010 | Accapadi et al. | |
| 7,710,741 B1* | 5/2010 | Kelleher | G06F 1/185 361/803 |
| 7,716,515 B2 | 5/2010 | Shih | |
| 7,814,255 B1 | 10/2010 | Deva | |
| 7,870,548 B2 | 1/2011 | Chu Chen | |
| 7,996,836 B1 | 8/2011 | McCorkendale et al. | |
| 8,032,899 B2 | 10/2011 | Archer et al. | |
| 8,082,391 B2 | 12/2011 | Brown | |
| 8,127,292 B1 | 2/2012 | Dobrovolskiy et al. | |
| 8,136,111 B2 | 3/2012 | Mall et al. | |
| 8,145,797 B2 | 3/2012 | Floyd | |
| 8,201,161 B2 | 6/2012 | Challener et al. | |
| 8,239,557 B2 | 8/2012 | McCune et al. | |
| 8,312,116 B2 | 11/2012 | Kohn | |
| 8,396,946 B1 | 3/2013 | Brandwine et al. | |
| 8,433,802 B2 | 4/2013 | Head et al. | |
| 8,514,868 B2 | 8/2013 | Hill | |
| 8,589,918 B1 | 11/2013 | Sapuntzakis | |
| 8,612,968 B2 | 12/2013 | DeHaan | |
| 8,661,286 B2 | 2/2014 | Schaefer | |
| 8,745,755 B2 | 6/2014 | Borzycki et al. | |
| 9,042,384 B2 | 5/2015 | Sridharan et al. | |
| 9,130,824 B2 | 9/2015 | Bhatia | |
| 9,170,798 B2 | 10/2015 | Nagaraja | |
| 9,203,748 B2 | 12/2015 | Jiang et al. | |
| 9,210,140 B2 | 12/2015 | Pope | |
| 9,298,524 B2 | 3/2016 | Lewis | |
| 9,323,552 B1 | 4/2016 | Adogla et al. | |
| 9,361,145 B1 | 6/2016 | Wilson et al. | |
| 9,379,781 B1 | 6/2016 | Browne | |
| 9,485,323 B1 | 11/2016 | Stickle et al. | |
| 9,772,912 B2 | 9/2017 | Richardson | |
| 9,898,435 B2 | 2/2018 | Kutch | |
| 9,930,051 B1 | 3/2018 | Potlapally | |
| 9,954,763 B1 | 4/2018 | Ye et al. | |
| 9,979,694 B2 | 5/2018 | Brandwine | |
| 10,051,041 B2 | 8/2018 | Reddy | |
| 10,057,267 B1 | 8/2018 | Miller et al. | |
| 10,095,537 B1 | 10/2018 | Neogy et al. | |
| 10,127,068 B2 | 11/2018 | Liguori et al. | |
| 10,318,311 B2 | 6/2019 | Liguori et al. | |
| 10,318,737 B2 | 6/2019 | Liguori et al. | |
| 10,498,611 B1 | 12/2019 | Kloberdans et al. | |
| 10,631,409 B2 | 4/2020 | Difoggio | |
| 10,725,519 B1 | 7/2020 | Misra | |
| 10,740,081 B2 | 8/2020 | Newell | |
| 10,812,366 B1 | 10/2020 | Berenberg et al. | |
| 10,860,452 B1 | 12/2020 | Boeker | |
| 11,113,046 B1 | 9/2021 | Bowen | |
| 11,467,636 B1* | 10/2022 | Rivnay | H05K 7/1487 |
| 2003/0070027 A1 | 4/2003 | Ng | |
| 2004/0177132 A1 | 9/2004 | Zhang et al. | |
| 2004/0215932 A1 | 10/2004 | Burky et al. | |
| 2005/0013280 A1 | 1/2005 | Buddhikot et al. | |
| 2005/0224307 A1 | 10/2005 | Steffen | |
| 2005/0251806 A1 | 11/2005 | Auslander et al. | |
| 2006/0206658 A1 | 9/2006 | Hendel et al. | |
| 2008/0244553 A1 | 10/2008 | Cromer et al. | |
| 2009/0249319 A1 | 10/2009 | Bai | |
| 2009/0327576 A1 | 12/2009 | Oshins | |
| 2010/0070970 A1 | 4/2010 | Hu et al. | |
| 2010/0106822 A1 | 4/2010 | Nagai et al. | |
| 2010/0205375 A1 | 8/2010 | Challener et al. | |
| 2011/0075667 A1 | 3/2011 | Li et al. | |
| 2011/0131443 A1 | 6/2011 | Laor et al. | |
| 2011/0255423 A1 | 10/2011 | Gustin | |
| 2011/0314469 A1 | 12/2011 | Qian | |
| 2012/0054832 A1 | 3/2012 | Ghosh | |
| 2012/0110650 A1 | 5/2012 | Van Biljon et al. | |
| 2012/0124129 A1 | 5/2012 | Klimentiev et al. | |
| 2012/0179802 A1 | 7/2012 | Narasimhan et al. | |
| 2013/0054948 A1 | 2/2013 | Raj et al. | |
| 2013/0291087 A1 | 10/2013 | Kailash et al. | |
| 2013/0305341 A1 | 11/2013 | Baker et al. | |
| 2013/0315243 A1 | 11/2013 | Huang et al. | |
| 2014/0208413 A1 | 7/2014 | Grobman et al. | |
| 2015/0160884 A1 | 6/2015 | Scales et al. | |
| 2015/0172169 A1 | 6/2015 | DeCusatis | |
| 2015/0356031 A1 | 12/2015 | Gintis | |
| 2015/0381484 A1 | 12/2015 | Hira | |
| 2015/0381773 A1 | 12/2015 | Visser | |
| 2016/0026573 A1 | 1/2016 | Jacobs et al. | |
| 2016/0072816 A1 | 3/2016 | Makhervaks | |
| 2016/0072910 A1 | 3/2016 | Eicher et al. | |
| 2016/0077845 A1 | 3/2016 | Earl et al. | |
| 2016/0170781 A1 | 6/2016 | Liguori et al. | |
| 2016/0170785 A1 | 6/2016 | Liguori et al. | |
| 2017/0024570 A1 | 1/2017 | Pappachan et al. | |
| 2017/0123935 A1 | 5/2017 | Pandit | |
| 2017/0300354 A1 | 10/2017 | Dalal et al. | |
| 2017/0322899 A1 | 11/2017 | Ni | |
| 2017/0366606 A1 | 12/2017 | Ben-Shaul et al. | |
| 2017/0371546 A1 | 12/2017 | Rivera | |
| 2018/0004954 A1 | 1/2018 | Liguori | |
| 2018/0024964 A1 | 1/2018 | Mao | |
| 2018/0074984 A1 | 3/2018 | Olarig | |
| 2018/0114000 A1 | 4/2018 | Taylor | |
| 2018/0139174 A1 | 5/2018 | Thakkar et al. | |
| 2018/0196947 A1 | 7/2018 | Davis et al. | |
| 2018/0210724 A1 | 7/2018 | Su | |
| 2018/0260125 A1 | 9/2018 | Botes et al. | |
| 2019/0188763 A1 | 6/2019 | Ye et al. | |
| 2020/0142842 A1 | 5/2020 | Ryu | |
| 2020/0183724 A1* | 6/2020 | Shevade | G06F 9/5016 |
| 2021/0081214 A1* | 3/2021 | Lambert | G06F 9/4411 |
| 2022/0122637 A1* | 4/2022 | Mendonsa | H05K 5/0247 |

FOREIGN PATENT DOCUMENTS

| | | |
|---|---|---|
| CN | 108431778 | 8/2018 |
| EP | 1701259 | 9/2006 |
| EP | 2557498 | 2/2013 |
| KR | 20040001211 | 1/2004 |

OTHER PUBLICATIONS

Amazon, "Announcing Amazon EC2 Bare Metal Instances (Preview)", Retrieved from URL: https://aws.amazon.com/about-aws/whats-new/2017/11/announcing-ec2-bare-metal-instances-preview/, pp. 1-4.

Brendan Gregg's Blog, "AWS EC@ Virtualization 2017: Introducing Nitro", Retrieved from URL: http://www.brendangregg.com/blog/2017-11-29/aws-ec2-virtualization-2017.html, pp. 1-11.

U.S. Appl. No. 15/905,681, filed Feb. 26, 2018, Uphendra Bhalchandra Shevade, et al.

U.S. Appl. No. 16/581,654, filed Sep. 24, 2019, Peter Zachary Bowen.

U.S. Appl. No. 16/581,651, filed Sep. 24, 2019, Peter Zachary Bowen.

AMD, "Secure Encrypted Virtualization API Version 0.16 Technical Preview", Advanced Micro Devices, Publication 55766, Revision 3.06, Feb. 2018. pp. 1-99.

Ittai Anati, et al., "Innovative Technology for CPU Based Attestation and Sealing", Retrieved from https://software.intel.com/en-us/articles/innovative-technology-for-cpu-based-attestation-and-sealing on Feb. 9, 2019, pp. 1-19.

Frazelle, "Opening Up the Baseboard Management Controller," ACM, pp. 38-40, 2020.

Graupner, et al., "Automation Controller for Operational IT Management," IEEE pp. 363-372, 2007.

Zali, et al., A Controller Based Architecture for Information Centric Network Construction and Topology Management, China Communication, Networks & Security, pp. 131-145, 2018.

Zhang, et al., "Real Time Thermal Management Controller for Data Center," IEEE, pp. 1346-1353, 2014.

(56) References Cited

OTHER PUBLICATIONS

Diao, et al., "An Adaptive Feedback Controller for SIP Survey Memory Overload Protection," ACM, pp. 23-32, 2009.
Prabhakar, et al., "QoS Aware Storage Cache Management in Multi-Server Environments," ACM, pp. 289-290, 2011.
U.S. Appl. No. 14/860,494, filed Sep. 21, 2015, Kevin Christopher Miller.
Amazon AWS, Example: Cisco ASA Device, Retrieved from http://docs.aws.amazon.com/ AmazonVPC/latest/NetworkAdminGuide/Cisco_ASA(WaybackMachine); Feb. 2013, pp. 1-5.
U.S. Appl. No. 16/581,646, dated Sep. 24, 2019, Anthony Nicholas Liguori.
MacStaadium Hosted Mac Private Cloud Solutions, "What makes a private cloud different", https://macstadium.com/cloud, pp. 1-7.
Sonnet Technologies Inc., "xMac mini Server", dated 2019, pp. 1-5.
U.S. Appl. No. 16/581,619, filed Sep. 24, 2019, Anthony Nicholas Liguori.
U.S. Appl. No. 15/817,071, filed Nov. 17, 2017, Cai, Diem K.
U.S. Appl. No. 16/147,460, filed Sep. 28, 2018, Marcin Piotr Kowalski.
Changhee Jung, et al., Adaptive execution techniques for SMT multiprocessor architectures:, PPoPP'05, ACM, Jun. 15-17, 2005, pp. 236-246.
Nael Abu-Ghazaleh, et al., "How the Spectre and Meltdown Hacks Really Worked", Retrieved from https://spectrum.ieee.org/computing/hardware/how-the-spectre-and-meltdown-hacks-really-worked on Jun. 3, 2019, pp. 1-18.
Microsoft Tech Community, Hyper-V HyperClear Mitigation for L1 Terminal Fault, Retrieved from https://techcommunity.microsoft.com/t5/Virtualization/Hyper-V-HyperClear-Mitigation-for-L1-Terminal-Fault/ba-p/382429 on Jun. 21, 2019, pp. 1-11.
Deborah T. Marr, et al., "Hyper-Threading Technology Architecture and Microarchitecture", Intel Technology Journal Q1, 2002, pp. 1-12.
Alexander Chartre, KVM Address Space Isolation, Retrieved from https://lwn.net/Articles/788273/ on Jun. 21, 2019, pp. 1-6.
Andy Greenberg, "Meltdown Redux: Intel Flaw Lets Siphon Secrets From Millions of PCS", Retrieved from https://www.wired.com/story/intel-mds-attack-speculative-execution-buffer/ on Jun. 3, 2019, pp. 1-20.
Microsoft, "Protect your Windows devices against speculative execution side-channel attacks", Retrieved from https://support.microsoft.com/en-us/help/4073757/protect-windows-devices-from-speculative-execution-side-channel-attack on Jun. 5, 2019, pp. 1-10.
Jochen Liedtke, et al., "Lazy Process Switching", Proceedings Eighth Workshop on Hot Topics in Operating Systems, IEEE, 2001, pp. 13-16.
Alexandre Chartre, "LKML: Kernel Address Space Isolation", Retrieved from https://lkml.org/lkml/2019/7/11/351 on Jul. 20, 2019, pp. 1-5.
U.S. Appl. No. 16/552,772, filed Aug. 27, 2019, Amit Shah.
U.S. Appl. No. 16/196,723, filed Nov. 20, 2018, Anthony Nicholas Liguori.
U.S. Appl. No. 15/173,445, filed Jun. 3, 2016, Wilson, et al.
U.S. Appl. No. 14/869,907, filed Sep. 29, 2015, David Sean Russell.
U.S. Appl. No. 14/864,682, filed Sep. 24, 2015, Danilov, et al.
U.S. Appl. No. 14/535,056, filed Nov. 6, 2014, Potlapally, et al.
U.S. Appl. No. 15/199,489, filed Jun. 30, 2016, Liguori, et al.
U.S. Appl. No. 15/199,479, filed Jun. 30, 2016, Liguori, et al.
Zsgur Ulusoy, "Processing Real-Time Transactions in a Replicated Database System," 1994 Kluwer Academic Publishers, Boston, Revised Sep. 10, 1993, pp. 1-32.
Sergio Almeida, et al., "ChainReaction: a Causal+ Consistent Datastore based on Chain Replication," Eurosys'Apr. 15-17, 13, 2013, Prague, Czech Republic, Copyright 2013 ACM 978-1-4503-1994-2/13/04, pp. 85-98.
Scott Lystig Fritchie, "Chain Replication in Theory and in Practice," Erlang'10, Sep. 30, 2010, Baltimore, Maryland, USA. Copyright 2010 ACM 978-1-4503-0253-1/10/09, pp. 1-11.
Robbert van Renesse, et al., "Chain Replication for Supporting High Throughput and Availability, USENIX Association, OSDI 2004: 6th Symposium on Operating Systems Design and Implementation," pp. 91-104.
Philip A. Bernstein, et al., "Concurrency Control and Recovery in Database Systems," Addison-Wesley Publication Company, ISBN 0-201-10715-5, 1987, pp. 1-58.
From Wikipedia, the free encyclopedia, "Bromium," downloaded on Jun. 27, 2016 from https://en.wikipedia.org/wiki/Bromium, pp. 1-4.
Xen, "Dom0" downloaded Jun. 6, 2016 from http://wiki.xen.org/wiki/Dom0, last updated Mar. 29, 2015, pp. 1-2.
Amazon Web Services, "Amazon Elastic Compute Cloud: User Guide for Linux Instances," Latest Version update 2015, pp. 1-816.
IBM, General Information, Version 4, Release 3.0, Fifth Edition, Apr. 2002, pp. 1-101.
From Wikipedia, the free encyclopedia, "Hypervisor," downloaded Jun. 6, 2016 from https://en.wikipedia.org/wiki/Hypervisor, pp. 1-7.
Axel Buecker, et al., "Reduce Risk and Improve Security on IBM Mainframes: vol. 1 Architecture and Platform Security," Redbooks, IBM, Dec. 2014, pp. 1-308.
From Wikipedia, the free encyclopedia, "VMware ESX," downloaded Jun. 6, 2016 from https://en.wikipedia.org/wiki/VMware_ESX, pp. 1-13.
From Wikipedia, the free encyclopedia, "Xen," downloaded from Jun. 6, 2016 from https://en.wikipedia.org/wiki/Xen, pp. 1-12.
U.S. Appl. No. 15/236,116, filed Aug. 12, 2016, Konrad Jan Miller et al.
International Search Report and Written Opinion from PCT/US2017/040049, Dated Sep. 13, 2017, Amazon Technologies, Inc., pp. 1-12.
Udo Steinberg, et al., "NOVA: A Microhypervisor-Based Secure Virtualization Architecture", ACM, EuroSys'10, Apr. 13-16, 2010, pp. 209-222.
Sangster, et al., TCG Published, Virtualized Trusted Platform Architecture Specification, Specification Version 1.0, Revision 0.26, Sep. 27, 2011, pp. 1-60.
Network Functions Virtualisation (NFV); NFV Security; Security and Trust Guidance, ETSI GS NFV-SEC 003, V1.1.2, downloaded by EP on Jun. 4, 2016, pp. 1-57.
U.S. Appl. No. 15/374,520, filed Dec. 9, 2016, Akhilesh Mritunjai.
International Search Report and Written Opinion from PCT/US2017/040066, Dated Sep. 21, 2017, Amazon Technologies, Inc., pp. 1-11.
Cong Xu, et al., "vSlicer: Latency-Aware Virtual Machine Scheduling via Differentiated-Frequency CPU Slicing", Purdue University, Purdue e-Pubs, 2012, pp. 1-14.
U.S. Appl. No. 16/196,736, filed Nov. 20, 2018, Anthony Nicholas Liguori et al.
International Search Report and Written Opinion from PCT/US2017/040076, mailed Oct. 6, 2017, pp. 1-13.
Amazon Web Services, "Amazon Elastic Compute Cloud: User Guide for Linux Instances," Latest Version update 2018, pp. 1-884.
Amazon Web Services, "Amazon Elastic Container Service: Developer Guide" API Version, Nov. 13, 2014, pp. 1-386.
Amazon Web Services, "AWS Lambda: Developer Guide" 2018, pp. 1-539.
AWS, "Annoucing Amazon EC2 Bare Metal Instances (Preview)", Retrieved from URL: https://aws.amazon.com/about-aws/whats-new/2017/11/announcing-amazon-ec2-bare-metal-instances-preview/ on Jan. 15, 2018, pp. 1-4.

* cited by examiner

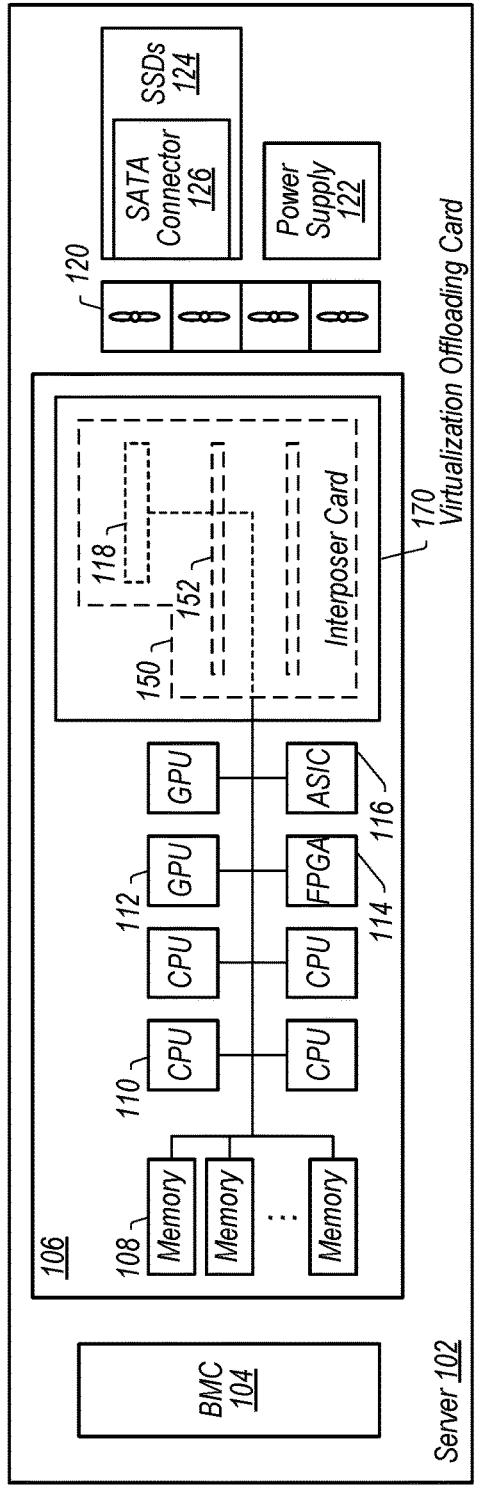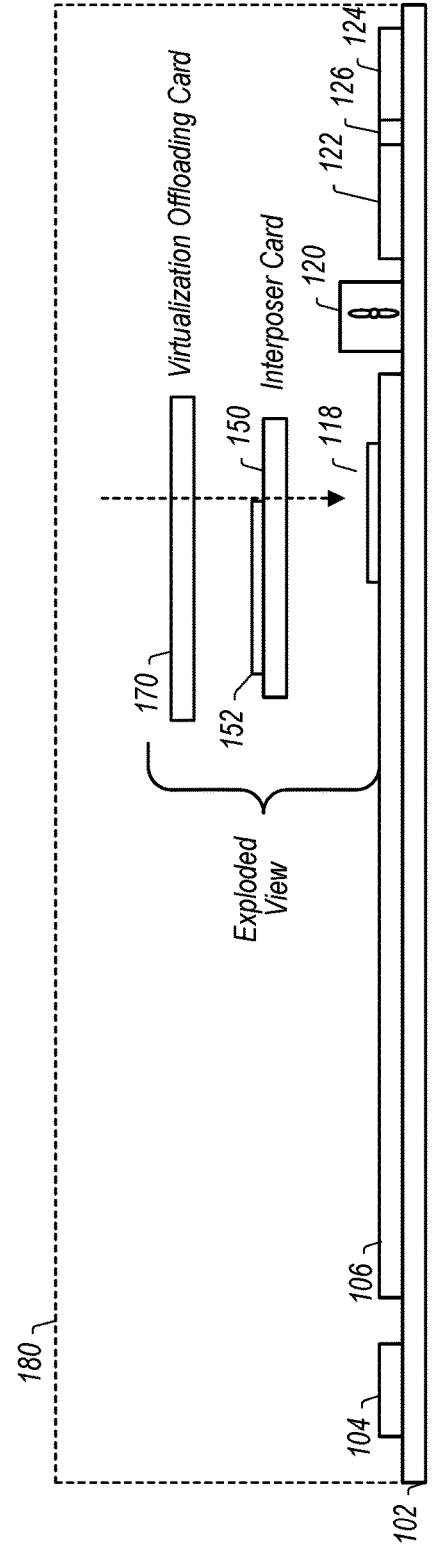

US 12,135,669 B1

HARDWARE FOR INTEGRATION OF SERVERS INTO A MANAGEMENT NETWORK

PRIORITY CLAIM

This Application claims benefit of priority to U.S. Provisional Application Ser. No. 63/316,324 entitled "HARDWARE FOR INTEGRATION OF SERVERS INTO A MANAGEMENT NETWORK", filed Mar. 3, 2022, and which is incorporated herein by reference in its entirety.

BACKGROUND

A cloud provider network (sometimes referred to simply as a "cloud") refers to a large pool of network-accessible computing resources (such as compute, storage, and networking resources, as well as applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load.

Some cloud providers that operate a cloud provider network may design and/or build their own computing resources, such as servers. For example, cloud provider designed computing resources, such as servers, may be designed in a way that the servers include hardware and/or firmware for integration with a data center management network of the cloud provider.

Also, third party server designers or manufacturers may provide a wide variety of server configurations that are specifically designed to meet a wide variety of specific uses cases. In some cases, a variety of available server designs provided by third party manufacturers may exceed a variety of server designs internally designed by a cloud provider.

Due to the differences in varieties of designs, in some circumstances, it may be more economical and/or efficient for a cloud provider to use a server that has been specially designed for a particular use case by a third-party instead of the cloud provider creating their own server design for the particular use case. In such circumstances, the cloud provider may desire to integrate the third-party server into the cloud provider's data center management network without requiring significant design changes to the hardware and/or firmware of the third-party server.

BRIEF DESCRIPTION OF DRAWINGS

FIG. 1C illustrates the OEM server with the non-OEM interposer card and the network virtualization offloading card installed in a chassis of the OEM server without requiring hardware changes or firmware changes to the OEM server, according to some embodiments.

FIG. 1D illustrates an exploded side view of the non-OEM interposer card and the network virtualization offloading card that couple with the circuit board of the OEM server, according to some embodiments.

Figure 1A:
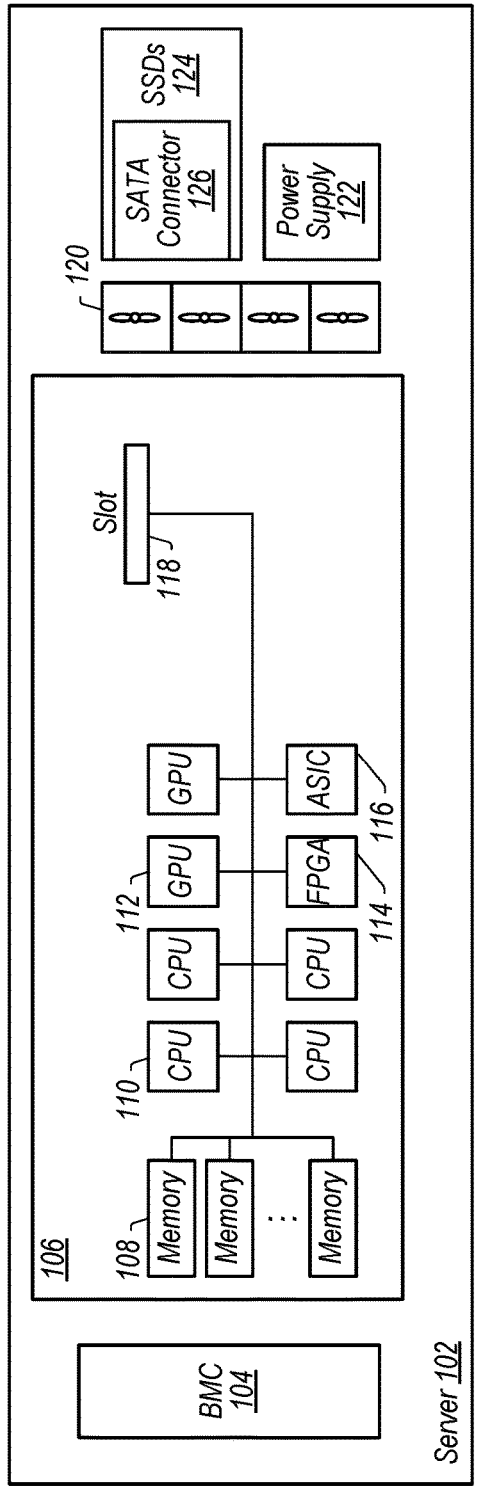
FIG. 1A illustrates an third-party server comprising a circuit board with memory, processors, and at least one expansion slot, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to systems, methods, and an apparatus for integrating a third party computing resource, such as a server, into a cloud service provider management network, wherein the third-party computing resource was not originally designed for integration into the cloud service provider network and lacks hardware, software, and/or firmware used by the cloud service provider network to manage computing resources included in the cloud service provider network. For ease of illustration, a third-party computing resource is described herein as an original equipment manufacturer server or OEM server, wherein the original equipment manufacturer is a third-party to a cloud service provider that is integrating the OEM server into the cloud service provider management network. However, in some embodiments, servers from various other sources may be transformed, as described herein, in order to be integrate the servers into a cloud service provider management network. For example, servers that may be modified, as described herein, for integration into a cloud service provider management network may include any servers that have a design that deviates from server designs typically used by the cloud service provider. For example, the different designs could result from the use of an OEM design, wherein a server is manufactured by an after-market manufacturer using an OEM design, or even could result from the integration of a previous server model designed or built by the cloud service provider network that lacks design characteristics of other server designs used by the cloud service provider network.

In some embodiments, a cloud service provider network may utilize virtualization offloading components (e.g., cards) (as further described in more detail below) to perform certain virtualization management and security tasks for computing instances implemented on physical computing resources, such as servers. The virtualization offloading component may be implemented on a separate piece of hardware, such as an expansion card, that is separate from the processors and memory that are being virtualized to provide computing instances to clients. In this way, the virtualization management control functions performed by the virtualization offloading component may be trusted as they are implemented on separate hardware and cannot be interfered with by client instances. For example, a first client using a virtualized computing resource is not able to alter virtualization management in a way that would impact a later client that used the same computing resources to provide a virtualized computing resource to the second client.

In some situations, a cloud service provider may design their own servers and include a proprietary virtualization offloading component in the cloud service provider designed servers. However, in some circumstances particular users of a cloud service provider may desire computing resources with particular attributes that deviate from attributes provided by cloud service provider designed servers. For example, a particular user may desire a computing instance with particular processor, memory, GPU, ASIC, FPGA, etc. attributes. Depending on user demand for such particular configurations, in some situations it may be inefficient and/or un-economical for a cloud service provider to custom design and build such servers having particular user desired/requested configurations. In such circumstances, it may be more efficient and/or economical for the cloud service provider to utilize third-party OEM server designs to provide the user with computing instances having the requested particular processor, memory, GPU, ASIC, FPGA, etc. attributes. However, the cloud service provider may, nevertheless, desire to protect the cloud service provider's management network from firmware and/or software that may be installed on the OEM server. Additionally, the cloud service provider may desire to integrate management (including virtualization management) for the OEM server into a management network of the cloud service provider using similar systems that are used for cloud service provider designed servers, such as virtualization management offloading. Thus, apparatus, systems, and methods are disclosed herein for integrating a third-party OEM server into a cloud service provider network using an interposer card and a virtualization offloading card, or alternatively using an aggregated interposer and virtualization offloading card. The interposer card, virtualization offloading card, or the aggregated card are configured to be installed in a chassis of a pre-built OEM server without requiring hardware or firmware changes to the OEM server (other than the addition of the interposer card, virtualization offloading card, or aggregated card).

In some embodiments, a non-OEM interposer card (e.g., an interposer card not originally included in the OEM server) may be configured to couple in an expansion slot of the OEM server, such as a standard PCIe slot included in a circuit board of the OEM server. Additionally, the non-OEM interposer card may include slots configured to couple with a virtualization offloading card. For example, in some embodiments, a non-OEM interposer card may include a plurality of slots (which in some embodiments may include two cool edge slots with 16 data lanes each, though various other slot configurations may be used). In some embodiments, a non-OEM interposer card may include a PCIe connector on a first side that is configured to be inserted into a PCIe slot of an OEM server, and may include, on an opposite side, a set of one or more connectors, such as 2×16 cool edge slots, configured to couple a virtualization offloading card to the non-OEM interposer card.

In some embodiments, the non-OEM interposer card (also referred to herein simply as the interposer card) may further include a baseboard management controller (BMC) configured to act as a management firewall between a BMC of the OEM server, the virtualization offloading card and/or a cloud service provider network management controller connected to either the non-OEM interposer card or the virtualization offloading card. For example, in some embodiments, the non-OEM interposer card may further include additional connectors, such as RJ45 connectors, configured to couple the non-OEM interposer card to a cloud service provider management console switch. Also, in some embodiments, the additional connectors (e.g., RJ45 connectors) may be configured to couple the non-OEM interposer card to other non-OEM interposer cards included in other OEM servers mounted in a rack with the given OEM server in which the non-OEM interposer card is installed. Additionally, in some embodiments, at least one of the connected non-OEM interposer cards may be connected via one of the additional connectors (e.g., RJ45 connectors) to a rack management controller. In some embodiments, the rack-management controller may be provided by the OEM that provided the servers installed in the rack and perform local rack management functions.

In some embodiments, a BMC of a non-OEM interposer card may receive telemetry information from a BMC of the OEM server and/or the OEM rack management controller and may further pass telemetry information (or some part thereof) to the cloud service provider management network. Additionally, the BMC of the non-OEM interposer card may receive control commands from the cloud service provider management network and/or the attached virtualization offloading card and may serve as a proxy that causes these commands to be implemented at the OEM server via the BMC of the OEM server. In some embodiments, a BMC of the non-OEM interposer card may function as a management overlay that monitors the management devices within the OEM server (e.g., third-party server from the perspective of the cloud service provider).

In some embodiments, a non-OEM interposer card may be configured to be installed in a standard slot (e.g., PCIe slot) of various different third party (e.g., OEM) servers that have various attributes (e.g., combinations of processors, memory, specialized processors, etc.).

In some embodiments, a cloud service provider network may offer virtual compute instances with varying computational and/or memory resources. In one embodiment, each of the virtual compute instances may correspond to one of several instance types. According to the present disclosure, one or more instance types of the cloud service provider network may be instantiated on third-party hardware, such as an OEM server. In some embodiments, a common hypervisor system may manage both compute instances instantiated on the third-party hardware, as well as compute instances instantiated on various other types of hardware that were designed by the cloud service provider. Additionally, the same remote management controls may be employed to control both the third-party and in-house hardware.

In some embodiments, a cloud computing service may also be referred to herein as a virtualized computing service. In some embodiments, a cloud computing service may comprise a virtualized computing service that implements virtualized compute instances and the cloud computing service may also implement at least some bare-metal compute instances. An OEM computer system may be retrofitted to include a non-OEM interposer card comprising a baseboard management controller (BMC) for remotely controlling the OEM computer system and a virtualization offloading component for managing virtualization operations for instances to be launched on the OEM computer system, wherein the BMC of the non-OEM interposer card and the virtualization offloading component are included in a same server chassis of the OEM computer system.

The virtualization offloading component may manage, at least in part, communications between compute instances instantiated on the OEM computer system and other computing instances of the cloud computing service. Additionally, or alternatively, the virtualization offloading component may manage communications between compute instances instantiated on the OEM computer system and one or more other services of a provider network that includes the cloud computing service or devices external to the provider network. For ease of description, a virtualized offloading component is referred to herein. However, it should be noted that in some embodiments, a similar component as a virtualization offloading component may perform similar functions for bare-metal instances.

In some embodiments, the virtualization offloading component may provide a compute instance instantiated on the OEM computer system access to a client selected machine image stored in a block-based storage service of the provider network for use in booting the compute instance (e.g., virtual machine) on the OEM computer system. Also, in some embodiments, the virtualization offloading component may manage network traffic between a compute instance instantiated on the OEM computer system and other instances or services of the provider network. For example, the virtualization offloading component may route packets to or from the compute instance over a substrate network of the cloud computing service and may perform encapsulation or address re-direction of the packets. In some embodiments, a cloud services offloading component may perform similar network traffic management functions for bare-metal instances included in a cloud service provider network. Additionally, the virtualization offloading component and/or cloud services offloading component may manage security for a compute instance instantiated on the OEM computer system. For example, the virtualization offloading component or cloud services offloading component may encrypt and decrypt incoming and outgoing traffic and may manage security keys for the compute instance instantiated on the OEM computer system. Additionally, the virtualization offloading component may manage traffic such that a given compute instance instantiated on an OEM computer system is included in an isolated virtual network, e.g., a virtual private cloud, and may manage address translation between private and/or public addresses for the compute instance. In some embodiments, these virtualization tasks may be performed on processors or cores of the virtualization offloading component that are separate from hardware of the OEM computer system, but that are included in the same server chassis with the OEM computer system.

The baseboard management controller (BMC) of the non-OEM interposer card, may, in conjunction with the virtualization offloading component, enable remote control of the OEM computer system. For example, the BMC of the non-OEM interposer card may be connected to the OEM computer system and may emulate devices that the non-OEM system expects to see attached to the OEM computer system. For example, the BMC of the non-OEM interposer card may emulate a monitor, a keyboard, a mouse, etc. In some embodiments, such emulation may be performed in conjunction with the BMC of the OEM server.

In some embodiments, a virtual computing service may remotely operate an OEM third-party computer system via a virtualization offloading component and/or BMC of a non-OEM interposer card. In some embodiments, a BMC of a non-OEM interposer card may include a remote virtualization offloading controller that is in communication with a virtualization offloading component coupled to the non-OEM interposer card BMC. In some embodiments, the virtualization offloading component may include a root of trust component and may permit or prohibit actions from being taken by the BMC of the non-OEM interposer card based on whether or not a root of trust can be verified. Additionally, the OEM computer system may include a separate root of trust used to boot the OEM computer system and the root of trust of the virtualization offloading component may be an additional layer of trust in addition to that of the OEM computer system.

In some embodiments, a virtualized computing service and/or cloud computing service may be one of among a plurality of network-accessible services (e.g., including storage services, database services, etc.) implemented at a provider network or in a cloud computing environment. The OEM servers comprising third party computer systems may be located at data centers of such a provider network, at co-location facilities (e.g., a location such as a building or room in which computing-related resources of more than one organization may be hosted), and/or at client-owned premises connected to the provider network via a network connection.

The OEM computer system and the non-OEM interposer card as described herein may be connectable using industry-standard components, such as cables and/or connectors. For example, for OEM third-party computer system that adheres to widely used industry standards for peripheral connectivity (such as Peripheral Component Interconnect-Express (PCIe) or Universal Serial Bus (USB)), the functionality incorporated within the virtualization offloading component and/or non-OEM interposer card BMC may allow compute instances launched at the OEM third party computer system to obtain all the benefits (e.g., manageability, security, connectivity to other network-accessible services, and the like) provided to compute instances set up on a fleet of cloud service provider designed servers selected or designed by the operator of the virtualized computing service or cloud computing service.

The virtualization offloading component may initiate one or more configuration operations of a compute instance on behalf of the client in various embodiments, including for example launching the compute instance, changing networking or other configuration settings, terminating the instance, and so on. In at least one embodiment, a bare metal compute instance may be instantiated on a third-party OEM computer system on behalf of a user via a virtualization offloading component included in a server chassis with the third-party OEM computer system, enabling un-virtualized access to at least some of the third-party OEM computer system's hardware devices/components. In various embodiments, a compute instance implemented on a third-party OEM computer system may be configured within an isolated virtual network of the provider network based at least in part on operations performed using the one or more networking managers running at a virtualization offloading component included in a server chassis with the third-party OEM computer system. Such networking managers may, for example, store an indication of a network address (within a range of private network addresses of an isolated virtual network established at the virtualized computing service or cloud computing service) which has been assigned to a compute instance configured at the third-party OEM computer system, and/or may assign such an address to a virtual network interface programmatically attached to such a compute instance.

In some embodiments, a compute instance of a third-party OEM computer system may be provided access to a root volume (and/or other logical storage devices, file systems, and the like) based at least in part on operations performed by the one or more storage managers running at the virtualization offloading component included in the server chassis with the third-party OEM computer system. For example, in some embodiments the storage managers may set up, modify, or otherwise configure the root volume using a block-storage service of the provider network, and/or other logical storage devices, file systems and the like. In some embodiments, the virtualization offloading component may comprise one or more persistent storage devices (e.g., devices accessible via an NVME (non-volatile memory express) interface) at which the contents of the root volume and/or other storage objects accessed from the compute instances of the third-party OEM computer system may be stored. Additionally, or alternatively, the virtualization offloading component may be connected, for example, via a SATA cable connection, to one or more solid-state drives included in the OEM server chassis at which the contents of the root volume and/or other storage objects accessed from the compute instances of the third-party OEM computer system may be stored.

According to at least one embodiment, the networking managers of the virtualization offloading component may include a network interface card (NIC) emulator and/or an IVN connectivity manager. Encapsulation/de-capsulation operations of the encapsulation protocol of the virtualized computing service or cloud computing service may be implemented at the networking managers in some embodiments. In at least one embodiment, the networking managers of the virtualization offloading component may be configured to log various types of network traffic directed to and/or from the compute instance(s), e.g., including Domain Name Service traffic directed to DNS servers in or outside the provider network, and provide such logs via programmatic interfaces to the client on whose behalf the compute instance is configured.

A number of programmatic interfaces (e.g., web-based consoles, command-line tools, graphical user interfaces, application programming interfaces (APIs) and the like) may be implemented by the cloud computing service (which may include a virtualized computing service) to enable clients to submit requests pertaining to compute instances in various embodiments and receive corresponding responses. For example, a client may submit a programmatic request to instantiate a compute instance on a third-party OEM computer system. In some embodiments, a cloud computing service may dynamically increase or decrease provisioned compute instances. For example, a client may request more or fewer instances via a command-line tool or graphical user interface and the cloud computing service may dynamically add or remove compute instances from the client's pool of allocated resources. Also, a client may dynamically add or remove compute instances to or from isolated virtual networks or VPCs allocated to the client.

According to some embodiments, as mentioned earlier, the provider network of the cloud computing service may implement one or more other services, such as a database service or an object storage service, which can be accessed from at least some compute instances of the cloud computing service executing on a third-party OEM computing resources using credentials assigned to the compute instances by an instance metadata service (IMDS) of the cloud computing service. Such an IMDS may also provide other metadata elements to compute instances executing on third-party OEM computing resources, including a unique identifier assigned by the cloud computing service to the compute instance, an identifier of a machine image used for the compute instance (if any), block device mappings information of the instance, and so on. In some embodiments, the metadata may be accessed from the compute instance executing on the third-party OEM computing resource via a link-local HTTP (HyperText Transfer Protocol) address accessible only from within the instance itself. In at least one embodiment, an agent of the IMDS may be run at a virtualization offloading component, and such metadata (including the credentials usable to access other provider network services from the compute instance) may be provided by the agent.

In some embodiments, a virtualization offloading component used to manage compute instances on a third-party OEM computer system may provide the same elasticity, scalability, reliability, and security that is offered to clients using default fleet compute instances. Also, a virtualization offloading component used to manage compute instances on a third-party OEM computer system may provide seamless access to other services of a service provider network of the cloud computing service, such as a virtual private cloud service (VPC or IVN), an elastic-block storage service (EBS), a load balancing service (LBS), etc.

FIG. 1A illustrates an OEM server comprising a circuit board with memory, processors, and at least one expansion slot, according to some embodiments.

In some embodiments, an OEM server 102 includes a baseboard management controller (BMC) 104, a circuit board 106, fans 120, storage devices 124, which may be solid state drives, hard drives, etc., and a power supply 122. In some embodiments, various other components (not shown) may be included in an OEM server. In some embodiments, the circuit board 106 may include various memory and/or processors. For example, a selection of memory devices and processor devices in an OEM server may provide a particular capacity or server attribute requested or desired by a user of a virtualized computing service. As an example, circuit board 106 includes processors (CPUs) 110, graphics processors (GPUs) 112, field programmable gate array (FPGA) 114, and application specific integrated circuit (ASIC) 116. Note that various combinations of processors and memory devices may be arranged in various configurations in an OEM server, such as OEM server 102, in order to provide one or more particular types of functionality. Circuit board 106 also includes slot 118, which may be a standard slot, such as PCIe slot configured to accept an expansion card. Note that in some embodiments, storage devices 124 may further include a SATA connector 126 configured to couple with a cable connecting the storage devices 124 to a virtualization offloading card 170.

Figure 1B:
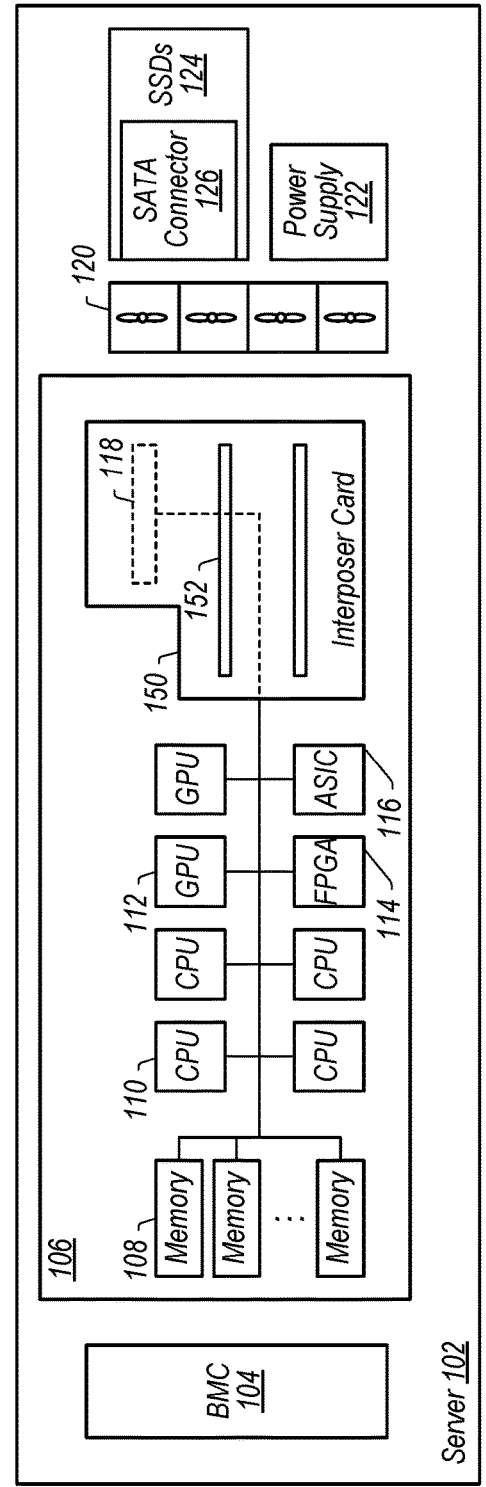
FIG. 1B illustrates the third-party server (e.g. an original equipment manufacturer, or OEM server), with a non-OEM interposer card coupled in the expansion slot, wherein the non-OEM interposer card comprises slots configured to couple with a network virtualization offloading card, wherein the network virtualization offloading card provides functionality that integrates the OEM server into a cloud service provider network and enables the OEM server to be used as an additional computing resource of the cloud service provider network, according to some embodiments.

FIG. 1B illustrates the OEM server, with a non-OEM interposer card coupled in the expansion slot, wherein the non-OEM interposer card comprises slots configured to couple with a network virtualization offloading card, wherein the network virtualization offloading card provides functionality that integrates the OEM server into a cloud service provider network and enables the OEM server to be used as an additional computing resource of the cloud service provider network, according to some embodiments.

In some embodiments, non-OEM interposer card 150 may couple into slot 118 and may include on an opposite side of the non-OEM interposer card 150 slots 152 that are configured to couple with a virtualization offloading card, such as virtualization offloading card 170. In some embodiments, slots 152 may include two 16 lane cool edge slots, though, in some embodiments, other connector types may be used. In some embodiments, the slots 152 may be provide a connection interface that is not available directly on circuit board 106. For example, circuit board 106 may lack connectors and/or space for directly connecting virtualization offloading card 170 to circuit board 106. Thus, the non-OEM interposer card 150 may act as an adapter between the two types of connectors (e.g., a type of connector included in the OEM server and a type of connector required by the virtualization offloading card). Also, as described above, the non-OEM interposer card may include its own BMC that acts as a firewall between a BMC 104 of the OEM server 102 and a management network of a cloud service provider network in which the OEM server 102 is being installed.

FIG. 1C illustrates the OEM server with the non-OEM interposer card and the network virtualization offloading card installed in a chassis of the OEM server without requiring hardware changes or firmware changes to the OEM server, according to some embodiments.

As shown in FIG. 1C, virtualization offloading card 170 may couple to the slots 152 of non-OEM interposer card 150 and be connected to circuit board 106 via non-OEM interposer card 150. As described in more detail with regard to FIG. 3, in some embodiments, virtualization offloading card 170 may provide various virtualization management functions for computing instances implemented using processors 110, GPUs 112, FPGAs 114 and ASIC 116 of OEM server 102.

FIG. 1D illustrates an exploded side view of the non-OEM interposer card and the network virtualization offloading card that couple with the circuit board of the OEM server, according to some embodiments.

As can be seen in FIG. 1D, non-OEM interposer card 150 may couple with PCIe expansion slot 118 of circuit board 106. Also, virtualization offloading card 170 may couple with slots 152 of non-OEM interposer card 150. Both the non-OEM interposer card 150 and the virtualization offloading card 170 may fit within chassis 180 of OEM server 102. In some embodiments, chassis 180 may have a 1U height, though in some embodiments other heights of OEM servers may be used.

Figure 2:
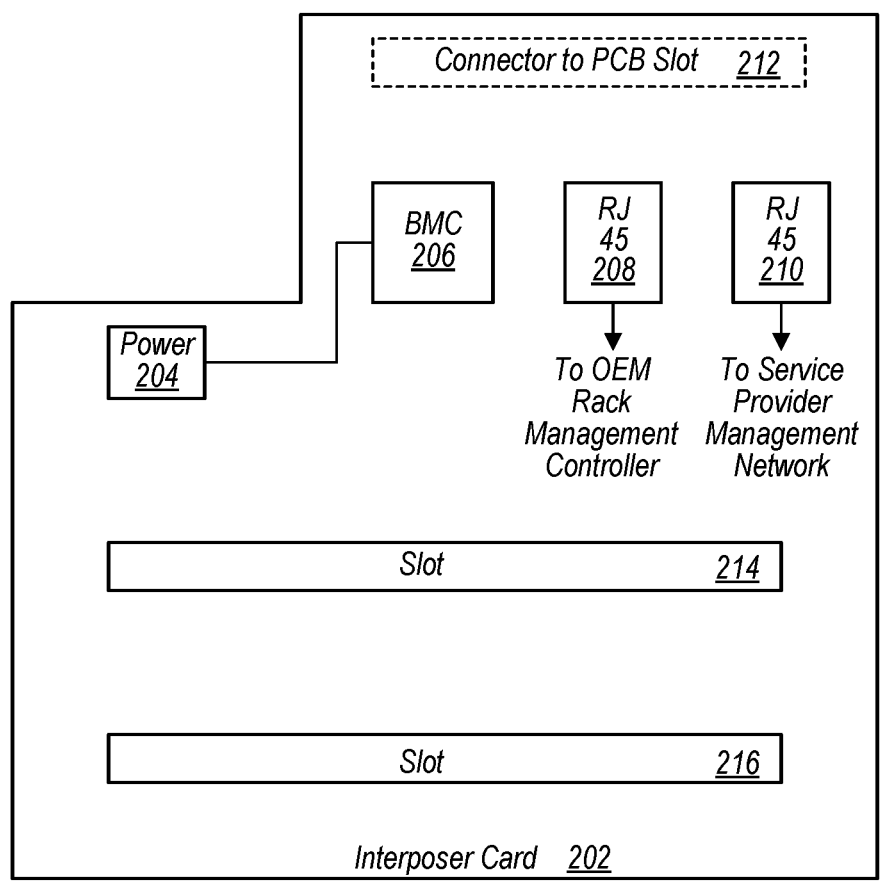
FIG. 2 illustrates an example non-OEM interposer card and example components that may be included in the non-OEM interposer card, according to some embodiments.

FIG. 2 illustrates an example non-OEM interposer card and example components that may be included in the non-OEM interposer card, according to some embodiments.

In some embodiments, non-OEM interposer card 150 illustrated in FIG. 1 may have similar components as interposer card 202 illustrated in FIG. 2. In some embodiments, interposer card 202 includes connector 212 configured to couple with a printed circuit board (PCB) slot connector of an OEM server, such as slot 118 of OEM server 106. Also, interposer card 202 includes slots 214 and 216 configured to couple with a virtualization offloading card, such as virtualization offloading card 170. Additionally, in some embodiments, interposer card 202 includes its own power connection 204 that is outside of power received via slot connector 212. For example, in some embodiments, interposer card 202 may be separately connected to a power source, such as a 3.3 volt power source. In some embodiments, interposer card 202 also includes its own BMC 206 that is separate and independent of a BMC 104 of OEM server 102. Additionally, in some embodiments, interposer card 202 includes connectors 208 and 210, which may be RJ45 connectors configured to accept connections to an OEM rack management controller, such as OEM rack management controller 614, and accept connections to a cloud service provider management network, such as management network 604 (both shown in FIG. 6).

Figure 3:
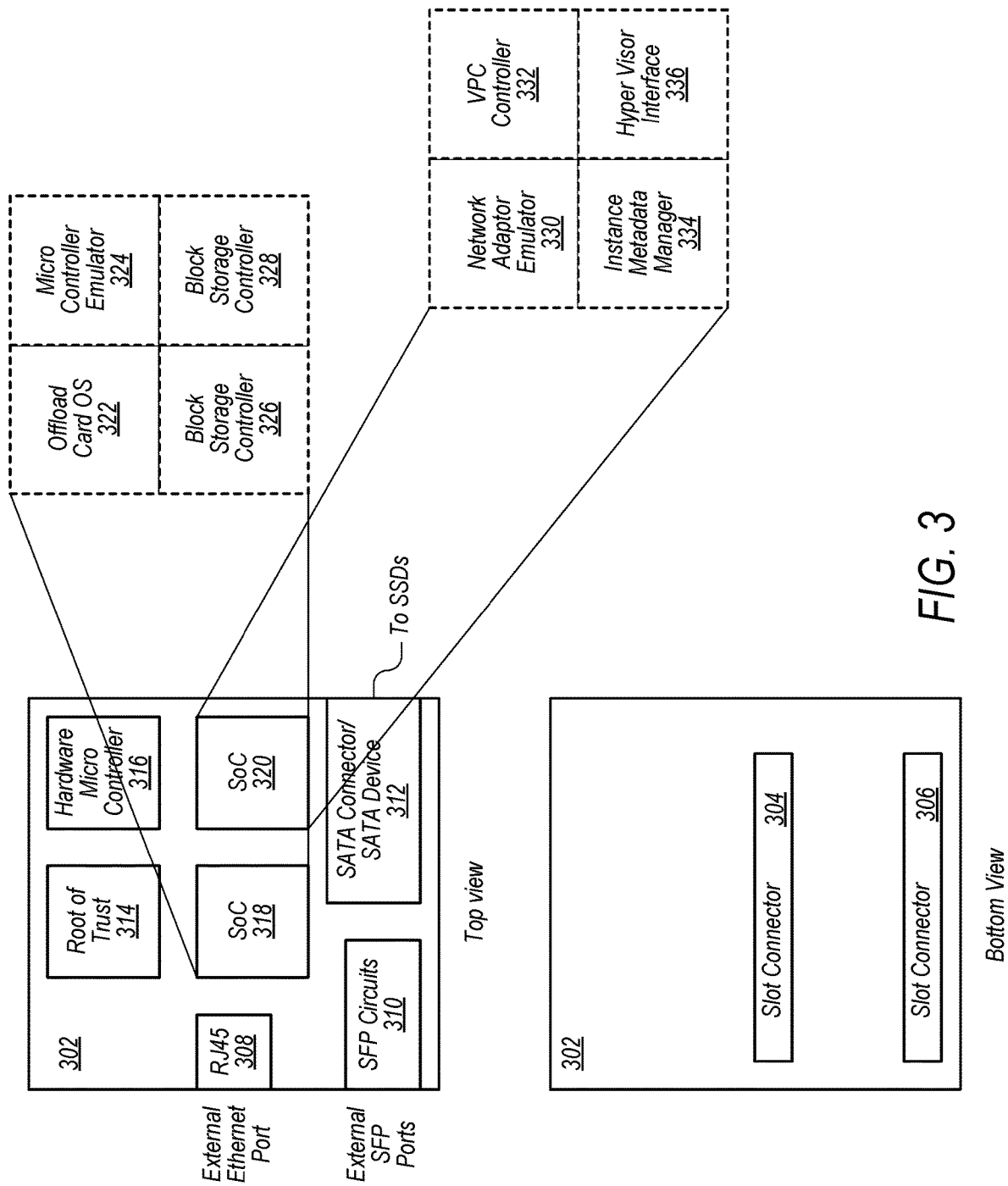
FIG. 3 illustrates an example virtualization offloading card and example processes running on processors of the virtualization offloading card to provide cloud service provider instance management for instances instantiated on a non-OEM server, according to some embodiments.

FIG. 3 illustrates an example virtualization offloading card and example processes running on processors of the virtualization offloading card to provide cloud service provider instance management for instances instantiated on a non-OEM server, according to some embodiments.

In some embodiments, the BMC 206 on interposer card 202 in combination with the virtualization offloading card 302 may function as a bridge between the OEM server 102 and a cloud computing service. For example, visualization offloading card 302 may be connected to a substrate network of a cloud computing service. Also, the virtualization offloading card 302 may provide control interfaces between the cloud computing service and a virtualization host (e.g., OEM server 102). The virtualization offloading card 302 may present non-volatile memory express (NVMe) and elastic network adaptors (ENA).

Virtualization offloading card 302 includes connectors 304 and 306 that connect virtualization offloading card 302 to interposer card 202. In some embodiments, connectors 304 and 306 may include connectors for power and multi-pin connectors that extend PCIe communications to the virtualization offloading card 302 from the BMC 206 of interposer card 202, which is in turn connected to BMC 104 of OEM server 102. In some embodiments, other types of connectors may be used. For example, in some embodiments, connectors 304 and 306 may include a power connector. In addition, virtualization offloading card 302 includes external Ethernet (RJ45) connector 308 and small form-factor port (SFP) and circuitry 310. Additionally, as discussed above, virtualization offloading card 302 includes a SATA connector 312 to connect the virtualization offloading card 302 to SSDs 124 of OEM server 102. Additionally, virtualization offloading card 302 includes root of trust component 314, hardware microcontroller 316 and systems on a chip (SoCs) 318 and 320. While, not shown, in some embodiments, virtualization offloading card 302 may include a separate power connection from the power connection provided to the interposer card 202. For example, in some embodiments, virtualization offloading card 302 may be provided a 12 volt power connection. In some embodiments, power supplied to both interposer card 202 and virtualization offloading card 302 may be provided from a power connector that receives power from power supply 122 and/or an intermediate power supply within chassis 180.

In some embodiments, an OEM computer system, such as OEM server 102, shown in FIG. 1 may include its own root of trust that acts as an additional layer of trust in addition to the root of trust component 314 of virtualization offloading card 302. In some embodiments, the root of trust component 314 may guarantee the virtualization offloading card 302 and the BMC 206 of interposer card 202 are booted from trusted firmware. In some embodiments, a root of trust component 314 may ensure that the SoCs 318 and 320 are booted using trusted firmware. Additionally, in some embodiments, root of trust component 314 may store keys or other encryption-related data used to ensure secure communications between components of virtualization offloading card 302 and BMC 206 of interposer card 202. Because virtualization offloading card 302 is implemented on a separate physical piece of hardware from OEM server 102, the operator of the cloud computing service may have greater control over security features of the virtualized offloading card 302 and may better restrict access to service management components implemented via the virtualization offloading card 302.

The virtualization offloading card 302 may include one or more processors/cores 318/320 as well as one or more memories (not shown). The term "virtualization offloading" may be used to describe a virtualization offloading card 302 because much of the work required to configure and manage compute instances running at OEM server 102 may be offloaded to a virtualization offloading card 302, enabling a larger fraction of the computing and other resources of the OEM server 102 to be utilized for the compute instances and client applications running at the compute instances. In the embodiment depicted in FIG. 3, code and data of a number of virtualization management component programs (e.g., software and/or firmware) may be stored locally on memory of the virtualization offloading card 302 or at SSDs 124 connected via SATA connector 312. In some embodiments, virtualization offloading card 302 may additionally, or alternatively, include a SATA device 312. The code and data may be run using the processors/cores 318/320. In at least some embodiments, individual ones of the virtualization management components may be executed using respective subsets of the available cores/processors—e.g., one of the cores may be used for an embedded operating system, another for a network interface card emulator, and so on. For example, FIG. 3 illustrates SoC 318 running offload card OS 322, micro controller emulator 324, and two instances of block storage controller 326 and 328. Also, FIG. 3 illustrates SoC 320 running elastic network adaptor emulator 330, isolated virtual network/virtual private cloud controller 332, instance metadata manager 334, and hypervisor interface 336.

At least a portion of the code resident in the memories of the virtualization offloading card 302 and SSDs 124 may be used to manage various aspects of networking and storage for compute instances launched at OEM server 102, and may therefore be referred to as a combination of a networking manager and a storage manager. Note that at least in some embodiments, at least a portion of the code and/or data may be dynamically updated or modified, e.g., after one or more compute instances have been launched at the OEM server 102 using the code and data.

External Ethernet port 308 of virtualization offloading card 302 may connect RJ45 circuitry of virtualization offloading card 302 to a system management processor (e.g., a baseboard management controller of BMC 206 of interposer card 202). The system management processor, may be responsible for tasks such as monitoring the physical state of the OEM server 102, providing results of such monitoring, rebooting/restarting of the OEM server 102 when needed, and so on. Small form-factor circuitry 310, linked to one or more SFP ports, may be used to access a substrate network of a cloud computing service in at least some embodiments.

One or more types of local persistent storage devices may be incorporated within the virtualized offloading component 302 and/or BMC 206 of interposer card 202 in some embodiments, such as NVME (non-volatile memory express) device(s), other (non-NVME) solid state drives (SSDs) 124 accessible from SATA (Serial Advanced Technology Attachment) circuitry of the virtualization offloading card(s) 302, and so on. In at least some embodiments, storage manager code running at the virtualization offloading card 302 may use the local persistent storage devices 124 to configure root volumes and/or other logical storage devices for compute instances instantiated at the OEM server 102. In some embodiments, the storage manager code may implement block-level device interfaces locally (in effect implementing a subset of the functionality of a block storage service). In other embodiments, the storage manager may access a block storage service (and/or other network-accessible storage services) of the provider network to configure at least some storage devices.

Figure 4:
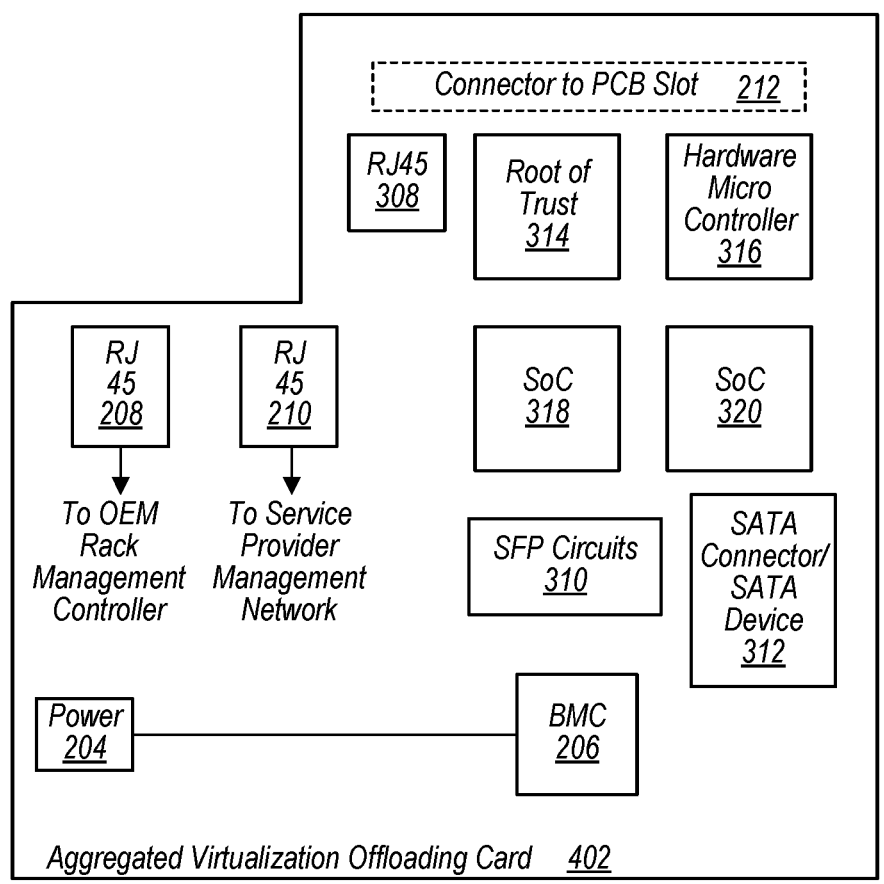
FIG. 4 illustrates an example aggregated virtualization offloading card, wherein components of the interposer card of FIG. 2 and the virtualization offloading card of FIG. 3 are aggregated into a single card configured to couple in an expansion slot of a circuit board of an OEM server, according to some embodiments.

FIG. 4 illustrates an example aggregated virtualization offloading card, wherein components of the interposer card of FIG. 2 and the virtualization offloading card of FIG. 3 are aggregated into a single card configured to couple in an expansion slot of a circuit board of an OEM server, according to some embodiments.

In some embodiments, instead of being implemented as two separate cards, interposer card 202 and virtualization offloading card 302 may be combined into a single aggregated virtualization offloading card 402, as shown in FIG. 4. In some embodiments the aggregated virtualization offloading card 402 may include slot connector 212 configured to couple with slot 118 of OEM server 102.

Figure 5:
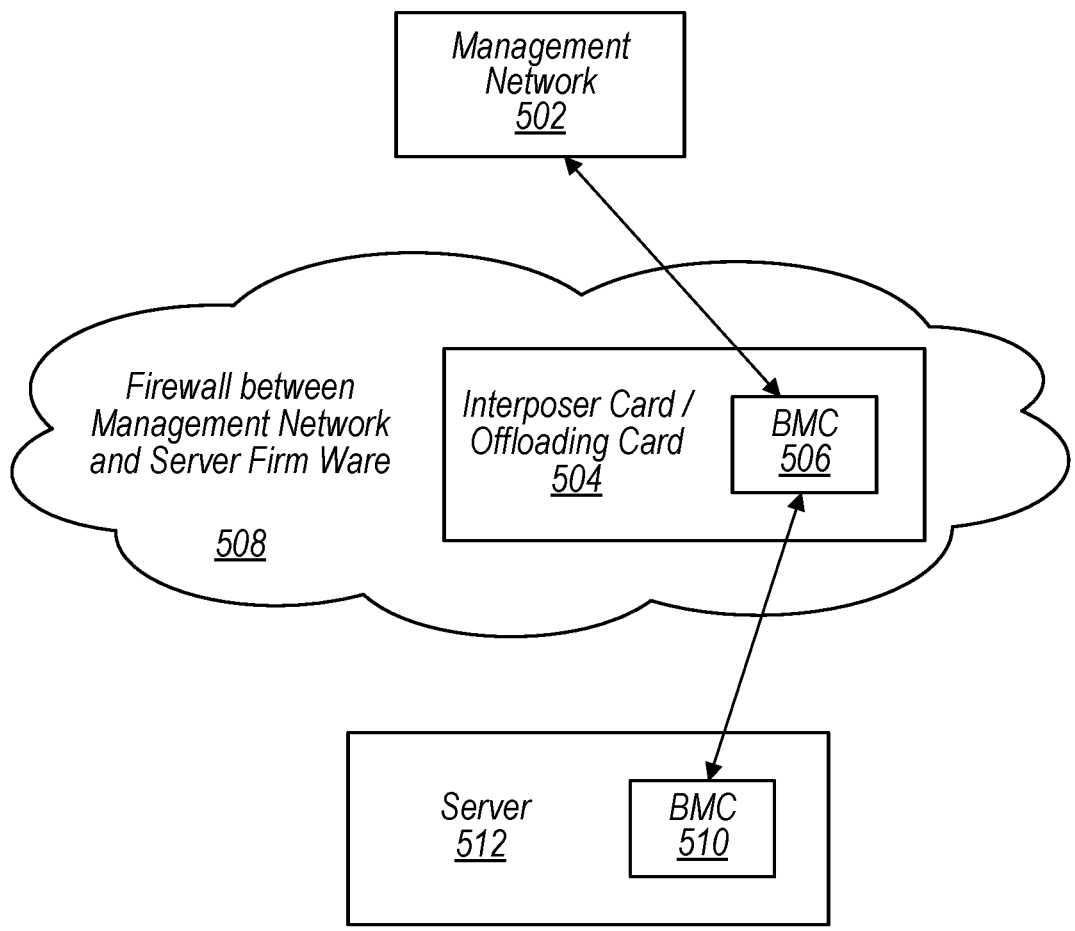
FIG. 5 is a logical block diagram illustrating how a baseboard management controller (BMC) on an interposer card/aggregated virtualization offloading card provides a firewall between a BMC of an OEM server and a management control network of a cloud service provider, according to some embodiments.

FIG. 5 is a logical block diagram illustrating how a baseboard management controller (BMC) on an interposer card/aggregated virtualization offloading card provides a firewall between a BMC of an OEM server and a management control network of a cloud service provider, according to some embodiments.

In some embodiments, a BMC of an interposer card (or aggregated virtualization offloading card), such as BMC 506 of interposer card 504, may function as a firewall 508 between management network 502 of a cloud service provider network and an OEM server, such as OEM server 512. In this way, only data and commands authorized to be passed on by BMC 506 may be provided to management network 502. Thus, BMC 506 provides a buffer (e.g., firewall) between the management network 502 of the cloud service provider network and the hardware and firmware of the OEM server 512, such as BMC 510.

Figure 6:
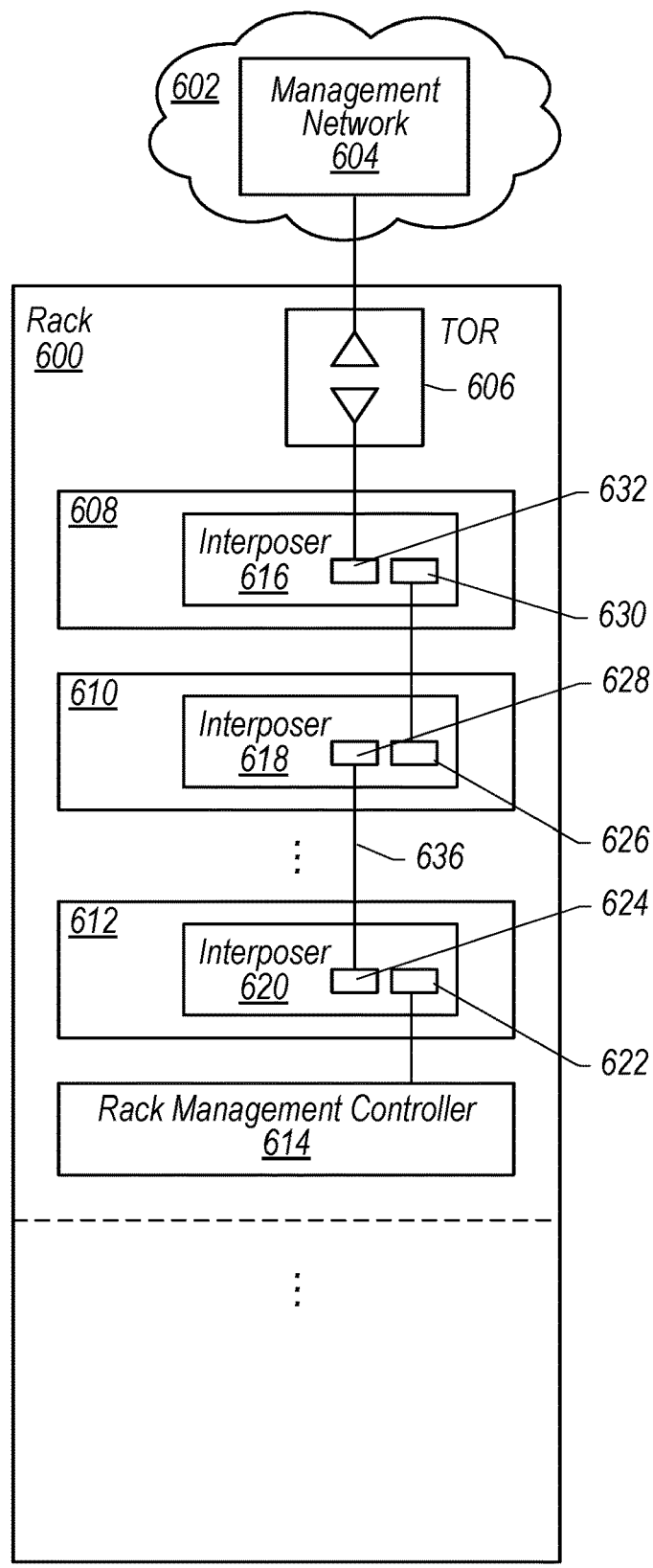
FIG. 6 illustrates example connections between non-OEM interposer cards, an OEM rack management controller, and a management control network of a cloud service provider, according to some embodiments.

FIG. 6 illustrates example connections between non-OEM interposer cards, an OEM rack management controller, and a management control network of a cloud service provider, according to some embodiments.

In some embodiments, non-OEM interposer cards are included in a plurality of OEM servers mounted in a rack may be connected to form a local network fabric. For example, rack 600 includes OEM servers 608, 610, and 612 mounted in the rack 600. Interposer cards 616, 618, and 620 of the OEM servers 608, 610, and 612 are connected via cables 636 coupled to RJ45 connectors 624, 626, 628, and 630. Additionally, RJ45 connector 622 of interposer card 612 is connected to OEM rack management controller 614 and RJ45 connector 632 of interposer card 616 is connected to management network 604 of cloud service provider 602 via top of rack switch 606. As described in FIGS. 7A and 7B, such connections may allow control signals and telemetry to be communicated to management network 604 and received from OEM rack management controller 614.

Figure 7A:
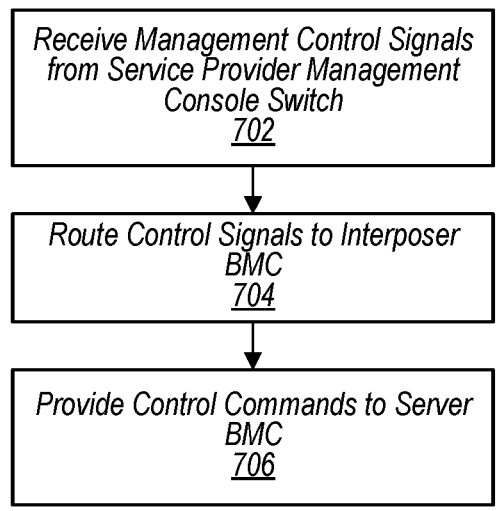
FIG. 7A is a flowchart illustrating a process of communicating control commands between a baseboard management controller (BMC) of an OEM server and a management control network of a cloud service provider via a non-OEM interposer card BMC that provides a firewall between the management control network of the cloud service provider and the BMC of the OEM server, according to some embodiments.

FIG. 7A is a flowchart illustrating a process of communicating control commands between a baseboard management controller (BMC) of an OEM server and a management control network of a cloud service provider via a non-OEM interposer card BMC that provides a firewall between the management control network of the cloud service provider and the BMC of the OEM server, according to some embodiments.

At block 702, management control signals are received at an interposer card from a service provider management console switch, such as may connect an interposer card to a management network, such as management network 604. At block 704, the control signals are routed to a BMC of the interposer card, such as BMC 206 of interposer card 202. Then, at block 706, the control signals are provided to the OEM server BMC, such as BMC 104 of OEM server 102, for execution of the control commands.

Figure 7B:
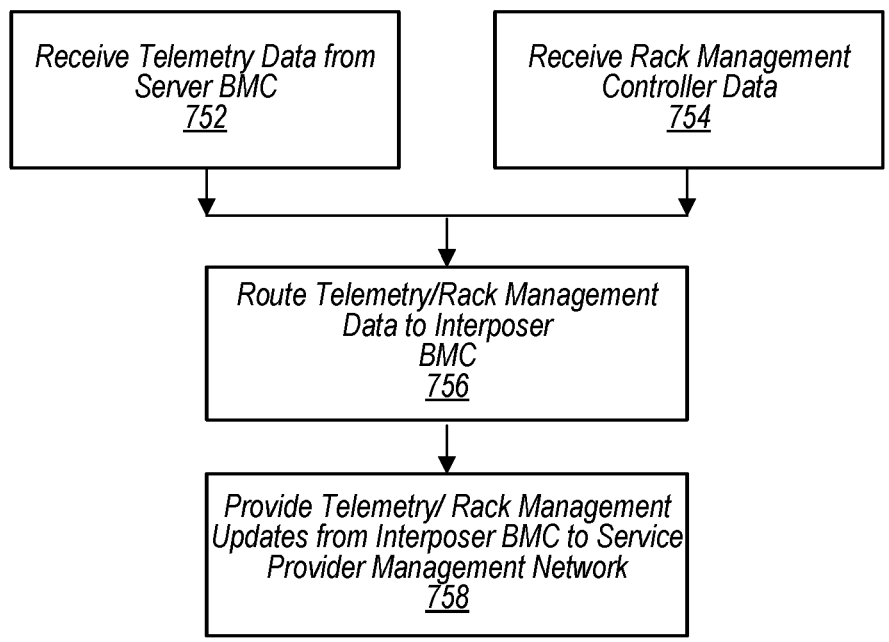
FIG. 7B is a flowchart illustrating a process of communicating telemetry and rack management control information between a baseboard management controller (BMC) of an OEM server, a rack management controller, and a management control network of a cloud service provider via a non-OEM interposer card BMC that provides a firewall between the management control network of the cloud service provider and the BMC of the OEM server and the rack management controller, according to some embodiments.

FIG. 7B is a flowchart illustrating a process of communicating telemetry and rack management control information between a baseboard management controller (BMC) of an OEM server, a rack management controller, and a management control network of a cloud service provider via a non-OEM interposer card BMC that provides a firewall between the management control network of the cloud service provider and the BMC of the OEM server and the rack management controller, according to some embodiments.

At block 752, telemetry data is received at an interposer card 202 from an OEM server BMC, such as BMC 104 of OEM server 102. Also, at block 754, OEM rack management controller data is optionally received at the interposer card 202 from a rack management controller, such as OEM rack management controller 614. At block 756, the telemetry data and/or rack management data is routed to the BMC 206 of the interposer card 202. Then, at block 758, the telemetry data and/or rack management data that has been confirmed to be non-malicious is provided to the cloud service provider management network, such as management network 604.

Figure 8:
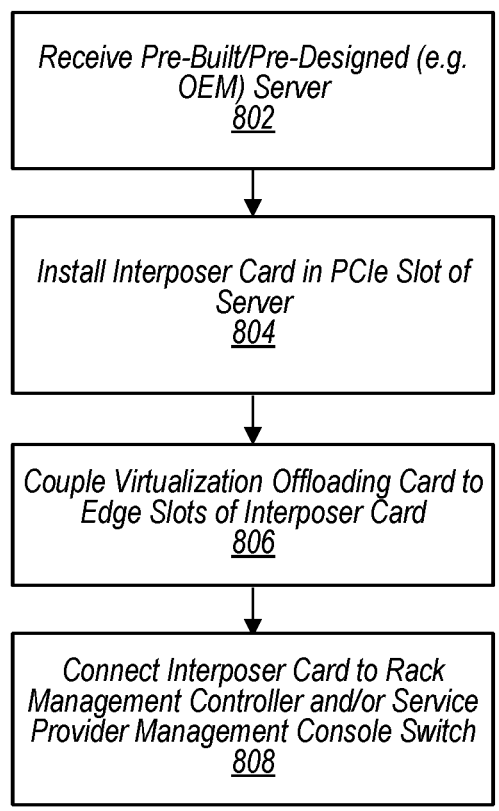
FIG. 8 is a flowchart illustrating a process of installing a non-OEM interposer card and a virtualization offloading card in an OEM server, according to some embodiments.

FIG. 8 is a flowchart illustrating a process of installing a non-OEM interposer card and a virtualization offloading card in an OEM server, according to some embodiments.

At block 802, a pre-built third-party OEM server is received. At block 804, an interposer card, such as interposer card 202, is installed in an expansion slot of a circuit board of the OEM server. At block 806, a virtualization offloading card is coupled to the interposer card. Note in some embodiments the virtualization offloading card and the interposer card may be coupled together first and then coupled with the circuit board of the OEM server. At block 808, the interposer card may optionally be coupled with other interposer cards of other OEM servers mounted in a rack with the OEM server and/or a rack management controller and/or a management network of the cloud service provider network. In some embodiments, the interposer cards may connect to a common switch in the rack, wherein the switch is further connected to a console switch for the management network of the cloud service provider network.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a server provided by an original equipment manufacturer (OEM), the server comprising:
        a chassis;
        a circuit board mounted within the chassis, the circuit board comprising:
            one or more processors;
            one or more memory devices; and
            a slot configured to accept an expansion card; and
        a baseboard management controller (BMC) mounted within the chassis; and
    a network virtualization offloading card provided by a third-party manufacturer, wherein the network virtualization offloading card is mounted in the chassis of the server, and wherein the network virtualization offloading card comprises:
        one or more processors configured to perform virtualization management for virtual computing instances instantiated using the one or more processors of the server provided by the OEM; and an interposer card mounted in the chassis of the server, and wherein the interposer card comprises:
- a first connector configured to couple the interposer card with the slot of the circuit board of the server provided by the OEM;
- a set of one or more additional connectors configured to couple the interposer card with a set of one or more connectors of the network virtualization offloading card; and
- a baseboard management controller (BMC), wherein the BMC of the interposer card is separate from the BMC of the circuit board.

2. The system of claim 1, wherein the interposer card further comprises:
an additional connector configured to couple the interposer card to a service provider management network managed by an entity other than the OEM,
wherein the BMC of the interposer card is configured to provide a firewall between program logic executing on the BMC of the server provided by the OEM and the service provider management network managed by the entity other than the OEM.

3. The system of claim 1, wherein the interposer card further comprises:
another additional connector configured to couple the interposer card to a rack management controller provided by the OEM.

4. The system of claim 1, further comprising:
a rack, wherein the server provided by the OEM and additional servers provided by the OEM are mounted in the rack;
a rack management controller provided by the OEM mounted in the rack; and
a networking device coupled to an additional connector of the interposer card, wherein the networking device is configured to provide network connectivity between the BMC of the interposer card and a service provider management network managed by an entity other than the OEM.

5. The system of claim 1, wherein:
the first connector of the interposer card configured to couple with the slot of the circuit board of the server provided by the OEM; and
the set of one or more additional connectors of the interposer card configured to couple with the set of one or more connectors of the network virtualization offloading card,
are differently configured connectors.

6. An interposer card, comprising:
a first connector configured to couple the interposer card with a slot of a circuit board of a server;
a set of one or more additional connectors configured to couple the interposer card with a network virtualization offloading card; and
a baseboard management controller (BMC), wherein the BMC of the interposer card is separate from another baseboard management controller (BMC) of the server, wherein the BMC of the interposer card is configured to provide management commands received from the virtualization offloading card to the other BMC of the server.

7. The interposer card of claim 6, further comprising:
another connector configured to couple the interposer card to a rack-level management controller.

8. The interposer card of claim 6, further comprising:
an additional other connector configured to couple the interposer card to a service provider management network.

9. The interposer card of claim 8, wherein the BMC of the interposer card is configured to:
receive management commands from the service provider management network and relay the received commands to the BMC of the server.

10. The interposer card of claim 9, wherein the BMC of the interposer card is configured to:
receive telemetry data from the BMC of the server and relay the received telemetry data to the service provider management network.

11. The interposer card of claim 10, wherein the BMC of the interposer card is configured to:
implement a firewall between the BMC of the server and the service provider management network.

12. The interposer card of claim 6, further comprising:
a power connector configured to couple the interposer card to a power source outside of the slot of the circuit board in which the interposer card connects.

13. A method, comprising:
providing an interposer card comprising a baseboard management controller (BMC);
coupling the interposer card, on a first side, with a slot of a circuit board of a server; and
coupling the interposer card, on a second side, with a network virtualization offloading card of the server;
wherein:
the BMC of the interposer card is separate from another baseboard management controller (BMC) of the server; and
the BMC of the interposer card is configured to provide management commands received from the virtualization offloading card to the other BMC of the server.

14. The method of claim 13, further comprising:
coupling, via an additional connector of the interposer card, the interposer card to a rack-level management controller for a rack in which the sever is mounted.

15. The method of claim 13, further comprising:
coupling, via an additional connector of the interposer card, the interposer card to a service provider management network.

16. The method of claim 15, wherein the BMC of the interposer card is configured to:
receive, at the interposer card, management commands from the service provider management network; and
relay the received commands to the BMC of the server.

17. The method of claim 16, wherein the BMC of the interposer card is configured to:
receive telemetry data from the BMC of the server; and
relay the received telemetry data to the service provider management network.

18. The method of claim 17, wherein the BMC of the interposer card is configured to:
implement a firewall between the BMC of the server and the service provider management network.

19. The method of claim 13, further comprising:
coupling a power source to the interposer card, wherein the power source is a power source outside of the slot of the circuit board in which the interposer card is coupled.

20. The method of claim 13, further comprising:
placing the interposer card in a chassis of the server, wherein the virtualization offloading card is also placed in the chassis of the server.

* * * * *